(No Model.) 2 Sheets—Sheet 1.

O. J. CHILDS.
HARROW.

No. 571,895. Patented Nov. 24, 1896.

WITNESSES:
C. L. Bendixon
J. J. Laass

INVENTOR:
Orlando J. Childs
By E. Laass
his ATTORNEY (No Model.) 2 Sheets—Sheet 2.

O. J. CHILDS.
HARROW.

No. 571,895. Patented Nov. 24, 1896.

WITNESSES:
C. L. Bendixon
J. J. Laass

INVENTOR:
Orlando J. Childs
By E. Laass
his ATTORNEY

UNITED STATES PATENT OFFICE.

ORLANDO J. CHILDS, OF UTICA, NEW YORK.

HARROW.

SPECIFICATION forming part of Letters Patent No. 571,895, dated November 24, 1896.

Application filed March 20, 1893. Serial No. 466,801. (No model.)

*To all whom it may concern:*

Be it known that I, ORLANDO J. CHILDS, of Utica, in the county of Oneida, in the State of New York, have invented new and useful Improvements in Harrows, of which the following, taken in connection with the accompanying drawings, is a full, clear, and exact description.

This invention relates to the class of harrows which have the teeth pivotally connected to the frame to swing in planes parallel to the line of draft and adjustably sustained in their position by rods connecting the pivoted ends of the teeth to a lever pivoted to the harrow-frame and provided with a dog engaging a segment and locking the lever in its desired position; and my present invention has more particularly reference to the species of harrow shown in my prior application for patent, Serial No. 449,308, filed October 19, 1892.

The object of my present invention is to provide simpler, stronger, and more efficient means for adjustably sustaining the teeth in their desired position in relation to the projection of the points thereof beneath the harrow-frame; and to that end the invention consists in the improved construction and combination of parts hereinafter described, and specifically set forth in the claim.

The invention is fully illustrated in the annexed drawings, in which—

Figure 1:
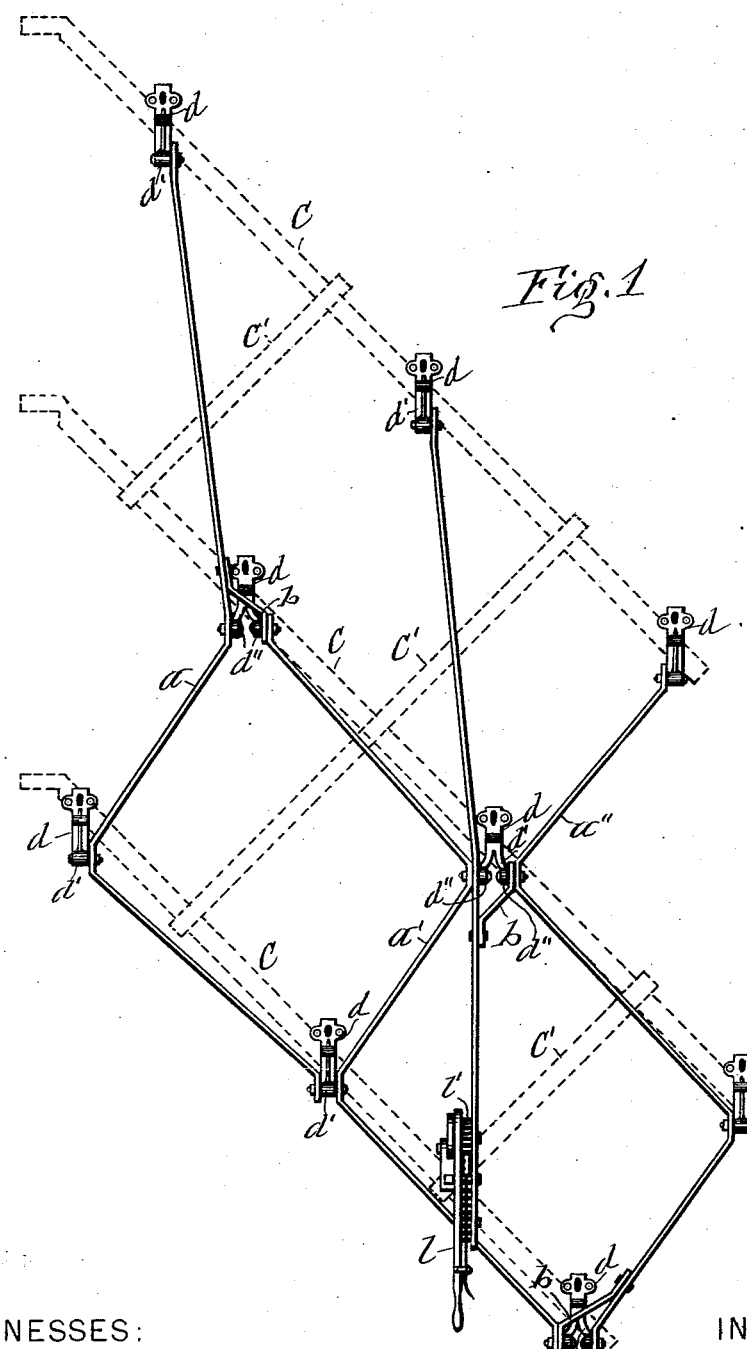
Figure 2:
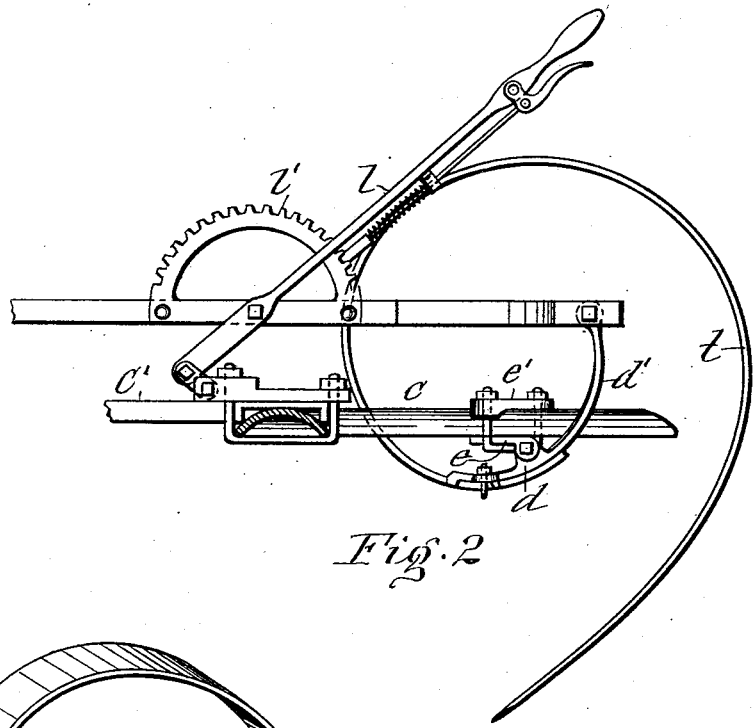
Figure 3:
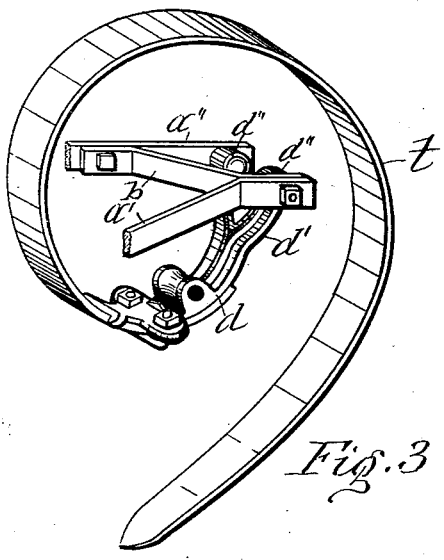
Figure 4:
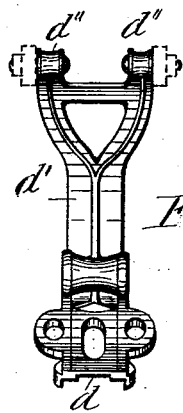

Figure 1 is a plan view of a section of a harrow embodying my improvements, the harrow-frame being shown by dotted lines to present more prominently the supplemental frame by which the teeth are sustained in their adjusted position. Fig. 2 is a side view of the attachment of one of the teeth and its connection with its adjusting-lever. Fig. 3 is a perspective view of the connection of the coupling-arm of the tooth with the frame by which it is connected to the adjusting-lever, and Fig. 4 is a detached front view of the aforesaid coupling-arm.

Similar letters of reference indicate corresponding parts.

C and C' represent the so-called "draft-bars" and "cross-bars," which are firmly tied together at their points of crossing to form the harrow-frame.

$t\ t$ represent the curved spring-teeth, which are fastened to shoes $d$, hinged or pivoted to plates $e$, fastened to the under side of the frame by clips $e'$, as clearly shown in Fig. 2 of the drawings, said teeth being thus allowed to be swung in vertical planes parallel to the line of draft and adjusted to carry the points of the teeth a greater or less distance beneath the frame, so as to cause them to penetrate the ground a greater or less depth, as may be desired, or to be drawn completely out of the ground when dragging the harrow to and from the field.

For adjustably sustaining the teeth in their desired positions the shoes $d$ are formed with upwardly-extending arms $d'$, terminating with perforated ears, through which heretofore was passed a transverse rod, which extended through the ears of all the arms pivoted to the same draft-bar, and the several rods thus required on the harrow were coupled together by longitudinal bars, one of which was connected to the lever $l$, by which the teeth were adjusted and sustained in their positions, said lever being fulcrumed on the harrow-frame and provided with the usual dog, which engages the toothed segmental $l'$ and locks the lever in its desired position.

The described connection of the lever $l$ with the arms $d'$ is objectionable in several respects, viz: The rods had to pass diagonally through the ears of the arms, and consequently in swinging the arms rearward or forward the rods became bound or cramped in the ears when integral with or rigidly attached to the arms, and to guard against this effect I resorted to the link connection between said parts, as shown in my prior application hereinbefore referred to. This latter construction, however, I find very expensive and subject to considerable wear. Aside from the aforesaid defects the longitudinal bars were connected to the transverse rods a considerable distance from the arms $d'$, and therefore said transverse rods were liable to be bent or sprung out of line by the strain exerted on them by the longitudinal bars. All of these defects I obviate by my present invention, which consists in the employment of a supplemental frame composed of bars rigidly tied to each other and pivotally connected directly to the arms $d'\ d'$. I preferably form the said frame of the zigzag longitudinal bars $a\ a'\ a''$, which approach and recede from each other and are firmly tied to each other at their approaches by means of braces $b\ b$, extending across from bar to bar and riveted or bolted thereto. The approached portions of the bars are a sufficient distance apart to receive between them the upper end of the arm $d'$, which is bifurcated and terminated with perforated ears $d''\ d''$ to afford two bearings on opposite sides of the arm, said ears being pivoted to the adjacent portions of the bars. It will be observed that by this construction I provide the arms with pivots which are axially at right angles to the line of draft and are thoroughly braced and sustained on a rigid adjusting-frame, which latter is simple and comparatively inexpensive in construction. In fact, the number of loose joints is reduced to a minimum, and consequently the wear is reduced correspondingly and all of the defects of the prior constructions are obviated.

Having described my invention, what I claim as new, and desire to secure by Letters Patent, is—

In combination with the harrow-frame and teeth pivotally connected thereto, the longitudinal zigzag bars $a\ a'\ a''$ approaching and receding from each other, arms extending upward from the pivoted ends of the teeth and having their upper ends entered between the approaches of the aforesaid bars and pivoted thereto, and braces $b\ b$ tying said bars together at their approaches as set forth.

In testimony whereof I have hereunto signed my name this 13th day of March, 1893.

ORLANDO J. CHILDS. [L. S.]

Witnesses:
W. E. SEAVEY,
J. S. SHERMAN.